Nov. 8, 1966  R. W. SUTTON  3,283,780
PIPE COUPLING

Filed Aug. 20, 1963  2 Sheets-Sheet 1

INVENTOR
ROBERT W. SUTTON
BY
ATTORNEY

Nov. 8, 1966  R. W. SUTTON  3,283,780
PIPE COUPLING

Filed Aug. 20, 1963  2 Sheets-Sheet 2

INVENTOR
ROBERT W. SUTTON

BY

ATTORNEY

United States Patent Office 3,283,780
Patented Nov. 8, 1966

3,283,780
PIPE COUPLING
Robert W. Sutton, Falls Church, Va., assignor to The Hydrand Corporation, Dover, Del., a corporation of Delaware
Filed Aug. 20, 1963, Ser. No. 303,338
2 Claims. (Cl. 137—614.04)

This invention relates to couplings for pipe and similar conduits and consists more particularly in new and useful improvements in a coupling primarily designed for rapidly coupling and uncoupling two sections of conduit, one of which is under internal fluid pressure.

An object of the invention is to provide a coupling comprising two identical units having complementary interlocking means and each being provided with an independent valve member, normally retained in closed position. By providing identical units, the manufacture of the couplings is greatly simplified and the cost minimized, and, in addition, the stocking of inventories is greatly facilitated, as any one unit is usable either as the upstream or downstream part of the coupling.

Another object of the invention is to provide a coupling of this character wherein the mating edges of respective coupling units are provided with a series of annularly arranged complementary fingers and recesses, alternately disposed for interlocking engagement to prevent the rotary movement of one unit with respect to the other.

Still another object of the invention is to provide each coupling unit with an insertable annular gasket of flexible, compressible material, designed to act under the force of internal pressure within the coupling, to sealingly contact the inner periphery of its respective unit, as well as the opposed annular edge of the complementary gasket of the opposite unit.

A further object of the invention is to provide a two-part coupling, each unit of which is provided with interlocking, annularly and alternately arranged fingers and recesses, as above referred to, and abutting gaskets which coact with the projecting fingers of the opposite unit to align the complementary fingers and recesses and facilitate assembly.

A still further object of the invention is to provide each of the coupling units with an independent valve, normally retained in closed position and adapted to be automatically shifted to open position by a projecting valve stem on the opposite valve, when the two units are joined and clamped together.

Another object of the invention is to provide identical quick-acting clamping means for use on opposite sides of the periphery of the coupling for clamping the two units in engagement.

Still another object of the invention is to provide a clamping device for use on opposite sides of the periphery of the coupling, including magnetic means to facilitate the positioning and retention of the complementary elements of the clamping device in locked position.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Figure 1:
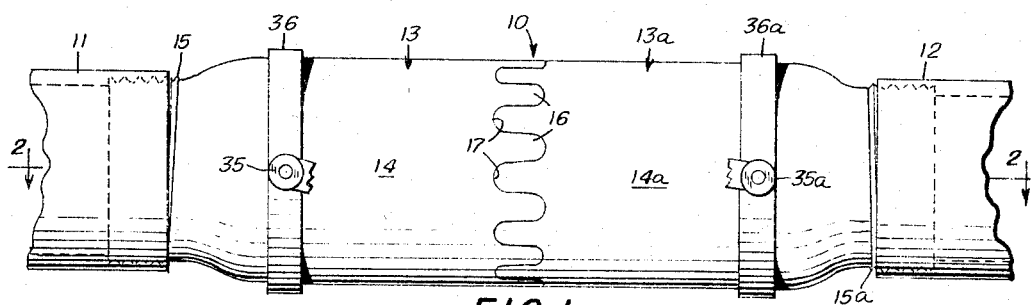
FIG. 1 is a view of the assembled and locked coupling in side elevation, the locking means being omitted for clarity.

There are numerous operations which require the coupling and uncoupling of sections of pipe or conduits, such for example, as the refueling of vessels and aircraft, the delivery of fuel oil and the like from tanks to points of utilization, the connection of spray headers in irrigation systems, and the connection of fire hoses to sources of water supply. In many of these uses, it is of extreme importance that the couplings be adapted for quick connection and disconnection and include means for controlling the flow of fluid during connection and disconnection. The coupling of the present invention was designed to meet these needs.

In the drawings, the coupling is generally indicated by the numeral 10 and is shown as installed in coupling relation and attached to two sections of conduit 11 and 12. These conduits may be those employed in refueling ships, airplanes, etc., in the delivery of fuel oil from a tank or truck to a consumer, or simply for the connection of a hose to a source of water under pressure.

The coupling comprises two identical units 13 and 13a, and therefore a description of one will suffice for both, it being understood that the numerals applied to the second unit and followed by the letter "a" are identical with the units to be described in connection with the first unit and carrying similar numerals.

The unit 13, for example, comprises a cylindrical housing 14 which is preferably reduced and threaded at one end as at 15 for connection to the section of hose or conduit 11. The opposite end of the housing 14 is provided with a series of annularly spaced, forwardly projecting fingers 16, alternately arranged with respect to intervening recesses 17, said fingers and recesses being complementary to those of the opposite unit 13a. Spaced inwardly from the forward extremity of the housing 14 in threaded engagement with the inner periphery thereof, is a valve seat 18, inwardly beveled as at 19 to accommodate a complementary, inwardly closable, beveled valve member 20. The valve 20 is provided with a valve stem 21, slidably mounted in the bore 22 of a cylindrical guide member 23, which is supported concentrically within the housing 14 by radial arms 24, the outer ends of which threadedly engage complementary threads on the inner periphery of the housing 14. A coil spring 25 surrounds the stem 21 between the valve 20 and the adjacent end of the guide member 23, so that the valve is normally urged into closed position on the seat 18 under the tension of spring 25. The interior of the bore 22 may be vented as at 26 to facilitate the reciprocation of the valve stem 21 therein.

Figure 3:
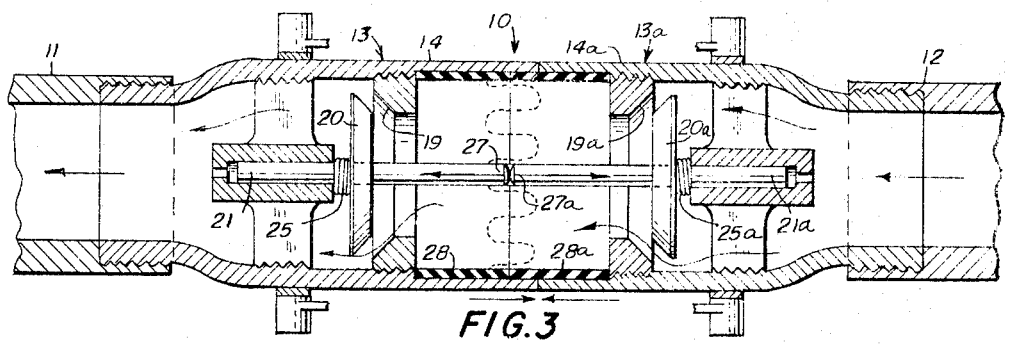
FIG. 3 is a similar view showing the two coupling units in engagement.
Figure 4:
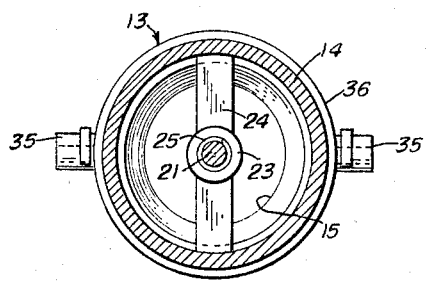
FIG. 4 is a sectional view taken on line 4—4 of FIG. 2.

A forward extension 27 of the valve stem 21 is of a length to concentrically abut the opposed end of the opposite valve stem projection 27a so that when the two units are joined, as shown in FIG. 3, each of the valve stem projections 27, 27a forces the opposite valve into open position against the tension of its spring, so as to provide a free flow of fluid through the conduits and coupling. Similarly, upon the withdrawal of one coupling unit from the other, both valves are automatically forced into closed position by their respective springs, and the coupling unit on the section of conduit which is under fluid pressure, will be additionally maintained in closed position by the internal fluid pressure in the conduit.

A resilient compressible gasket 28 is adapted to be inserted within the housing 14 in edgewise abutment with the valve seat member 18 with its opposite edge normally extending to a point spaced slightly inwardly from the outer end of the housing 14. The central portion of the gasket 28 is formed to normally provide an annular inward bulge 29 which, as will later appear, is radially deformable under the internal pressure in the housing, to cause the abutting edges of respective gaskets to engage in tight sealing contact, with the respective gaskets flattened out and maintained under pressure against the inner surfaces of the housings and their complementary fingers and recesses, as seen in FIG. 3.

Figure 2:
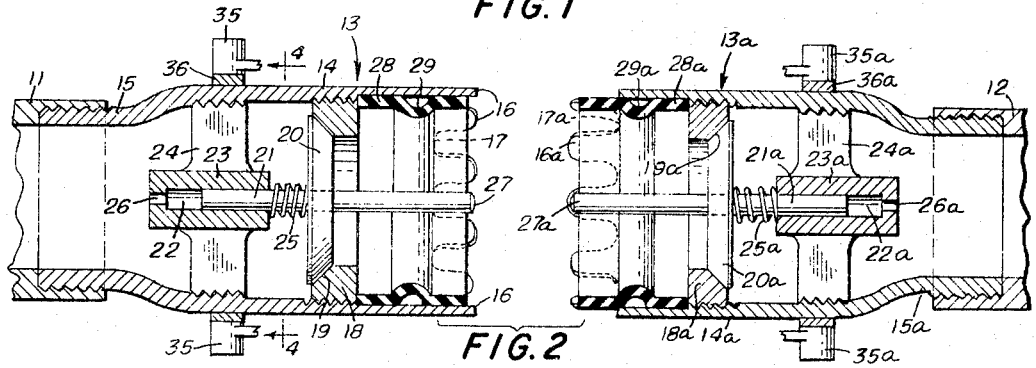
FIG. 2 is a transverse sectional view showing the internal parts of the individual coupling units, disengaged.

It will thus be apparent that when the two units 13 and 13a of the coupling are disconnected as shown in FIG. 2, their respective valves 20 and 20a are automatically closed by the springs 25, 25a, and the valve in whichever unit is under internal pressure will be maintained in closed position by said pressure, as the valves are internally closing valves. When it is desired to couple the two disconnected units 13 and 13a, they are brought into end-to-end positions so that the fingers 16 of unit 13 are in line for entry into the recesses 17a of unit 13a, and when the mating ends of the units are forced together, the inner surfaces of the respective fingers slide over the outer surfaces of the gaskets 28, 28a of the opposite unit so as to guide the joining of the units.

When the fingers of each unit have been inserted in the complementary recesses of the opposite unit to their extreme inward positions, they jointly form an unbroken periphery for the joined housings 14 and 14a, and the abutting edges of the gaskets 28 and 28a are forced into sealing contact with one another. The opposed longitudinal forces applied to the coupling units by the clamping mechanism hereinafter described, causes an axial compression of the abutting gaskets, which is facilitated by the bulges 29 and 29a, and at the same time, brings the valve stem extensions 27 and 27a into abutting relation, causing the automatic opening of both valves 20 and 20a, as shown in FIG. 3. In this finger, the fluid under pressure in unit 13a is admitted through the open valve 20a into the interior of the joined housings 14, 14a, and the internal pressure within the joined units causes the radial compression of the gaskets as shown. Here it will be apparent that these gaskets which are under tight compression, both radially and axially, are flattened and forced into tight sealing engagement, both with one another and with the inner peripheries of the joined housings 14, 14a. When the housings are disconnected, their respective valves 20, 20a are automatically closed by the springs 25, 25a so that the fluid in the conduit which is under pressure, is prevented from escaping.

Various means for clamping the units 14 and 14a in coupled position may be employed, but the preferred clamping means is illustrated in FIGS. 5 through 8. Here it will be seen that two identical clamping devices, generally indicated by the numerals 30 and 30a, are designed for concurrent clamping action on opposite sides of the periphery of the coupling.

Figure 5:
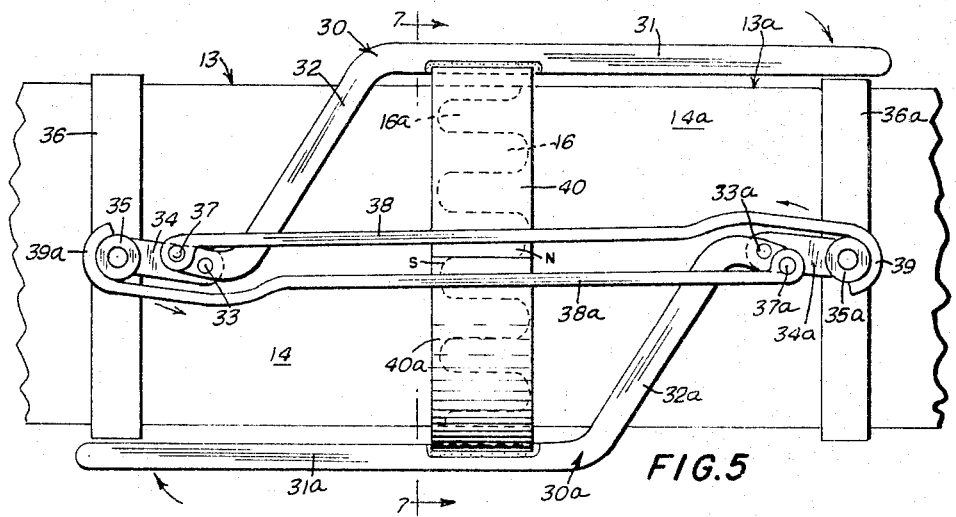
FIG. 5 is an enlarged fragmentary view in side elevation, illustrating the locking means for retaining the complementary units in engagement.
Figure 6:
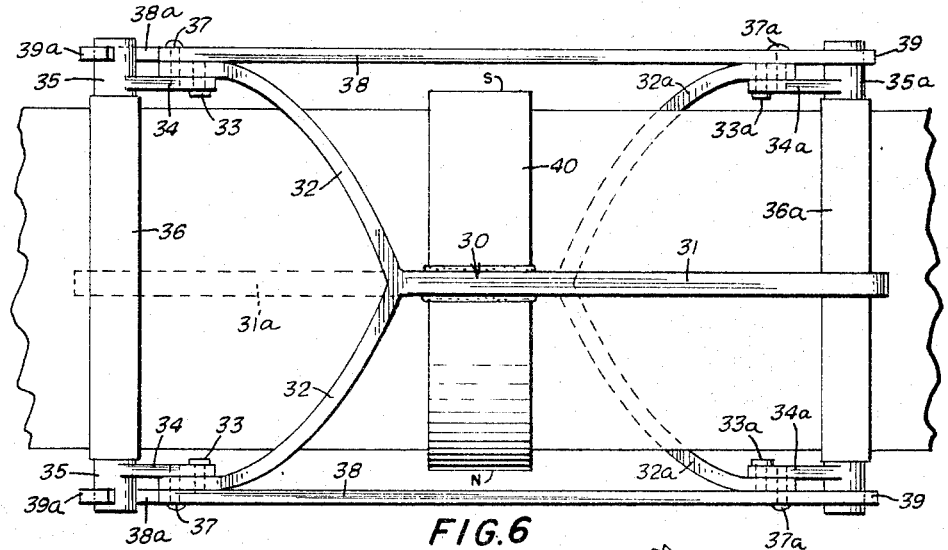
FIG. 6 is a similar view in top plan.
Figure 7:
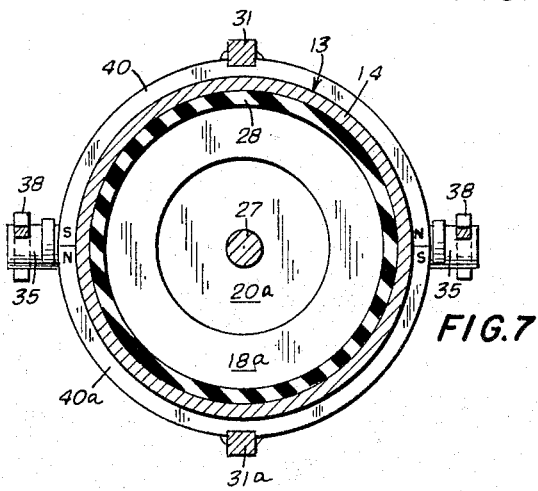
FIG. 7 is a transverse sectional view taken on line 7—7 of FIG. 5.
Figure 8:
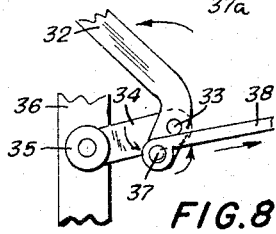
FIG. 8 is a detail of the toggle connection of one of the clamping elements in released condition.

Inasmuch as these clamping devices are identical, a detailed description of one will suffice. Thus, the clamping device 30 comprises a handle 31, terminating at one end in a downwardly inclined, bifurcated yoke 32 which, as seen in FIGS. 5 and 6, partially envelops the housing and is pivotally connected as at 33 to toggle arms 34 which are fixed to and project radially from heads 35 which are rotatably mounted on opposite sides of a peripheral collar 36, surrounding the housing 14 and rigidly secured thereto by any suitable means. Beyond their pivotal connections 33 to the arms 34, and eccentric with respect to said pivotal connections, the ends of the bifurcated yoke 32 are pivotally connected as at 37 to lock rods 38 which are otherwise free of connection to the radially projecting arms 34. The opposite ends of the lock rods 38 are hooked-shaped as at 39 and designed to engage over the rotatable heads 35a, carried by collar 36a on the opposite housing 14a, as seen in FIG. 5.

As previously indicated, the clamping device 30a is identical with that just described, and the hooked ends 39a of its lock rods 38a are designed for hooking engagement with the heads 35 which pivotally support the complementary locking device 30.

Thus, when the two handles 31 and 31a are in closed position, lying parallel along the periphery of the coupling as shown in FIG. 5, the force exerted by the toggle joints 33, 34, 35 and 37 and 33a, 34a, 35a and 37a, cause the respective lock rods 38 and 38a to be pulled inwardly in opposite directions, so that the heads 35 and 35a on the opposed coupling units are drawn together, and the units retained in locked position. Likewise, when the handles 31 and 31a are swung outwardly, the reverse action takes place and the hooks 39 and 39a are released from the respective heads 35 and 35a.

In this connection, it is to be noted that due to the rotary mounting of the heads 35 and 35a, the hooks 39 and 39a undergo a rolling action with respect to the heads, both in the locking operation and upon the release of the handles 31 and 31a. In other words, the hooks roll on and off of their respective heads, permitting the immediate connection and disconnection of the coupling and, at the same time, causing the opening or closing of the respective valves 20 and 20a.

As an added precaution against the release of the locked clamping device, each of the handles 31 and 31a is provided with an arcuate band 40 and 40a respectively, which is secured to the underside of the respective handles and of a diameter to closely embrace the outer periphery of the coupling at its junction. Thus, the arcuate band 40, connected to the handle 31, embraces one-half of the periphery of the coupling, and the arcuate band 40a, connected to the handle 31a, embraces the opposite half of the periphery, with their free extremities in abutting relation when the handles are closed. This arrangement tends to guide the handles into the proper closed positions and serves as an outer reinforcement for the joint formed by the interlocking fingers and recesses previously described.

The present invention also contemplates the use of permanently magnetized bands for this purpose, whereby, when the bands 40 and 40a are in closed positions in end-to-end abutment, they are magnetically retained against disengagement which further facilitates the positive locking of the clamping device.

It will be apparent that the coupling of the present invention provides a simple and efficient means for joining sections of conduit which may be rapidly connected and disconnected. Furthermore, the fact that both units of the coupling, as well as the clamping devices, are identical and interchangeable, their manufacture and stocking is greatly facilitated.

From the foregoing, it is believed that the invention may be readily understood by those skilled in the art without further description, it being borne in mind that numerous changes may be made in the details disclosed without departing from the spirit of the invention as set forth in the following claims.

I claim:

1. A conduit coupling consisting of two identical units, each comprising a cylindrical housing terminating at its forward end in alternate fingers and recesses forming a continuous sinuous line, which lies in a plane perpendicular to the longitudinal center line of the housing, the sinuous lines of the forward ends of respective housings being complementary so that the fingers of one housing interfit with the recesses of the other, the inner and outer peripheries of respective housings, in the vicinity of said fingers and recesses, being uninterrupted and uniformly cylindrical, providing, when the units are in interfitting relation, a continuous unbroken cylinder, a cylindrical gasket of resilient, compressible material freely disposed within the forward end of each housing, valve seats spaced inwardly from the forward end of each housing, defining the limit of rearward movement of respective gaskets therein, the forward edges of respective gaskets normally projecting within the areas bounded by said fingers and recesses and terminating in slightly rearwardly spaced relation to the forward extremities of the respective fingers, said gaskets lying in surface contact with the inner faces of said fingers, internally seating valves coacting with said valve seats, means normally closing respective valves, said valves being supported on concentric valve stems reciprocably mounted in respective housings, forward projections on respective valve stems, terminating adjacent the forward extremities of respective housings, and each aligned for abutting engagement with the valve stem projection of the opposite valve, whereby, when said housings are joined, the engagement of the projection of one valve stem with the projection of the other, acts to open the latter valve, clamping means independent of said fingers and recesses for forcing the fingers and recesses of respective housings longitudinally into engagement and causing the simultaneous edgewise compression of said gaskets, and each of said gaskets being provided intermediate its ends with an annular, normally inward bulge, whereby, when said units are joined and the opposed edges of respective gaskets are in abutment, internal pressure within the joined housings radially deforms the bulges of respective gaskets to effect sealing engagement between their abutting edges and peripheral sealing engagement within the area of the mating edges of said housings.

2. In a conduit coupling consisting of two identical units, each comprising a cylindrical housing contoured at one end for coaxial junction with the adjacent end of the housing of the other unit, and coacting gaskets of resilient, compressible material in respective housings; clamping means for forcing respective housings and gaskets into edgewise engagement, consisting of two identical clamping elements, each comprising a handle bifurcated at one end to provide a yoke, each of said housings being provided with two radially projecting locking heads mounted on opposite sides of its periphery, the bifurcated ends of said handles being pivotally mounted on respective locking heads, lock bars pivotally connected adjacent the ends of respective yokes by toggle devices mounted on said locking heads, the opposite ends of respective handles having hooks which are engageable over respective locking heads of the toggle device of the opposite unit, whereby, when the handles of each unit are rotated in one direction, their respective locking bars engage the locking heads of the opposite unit and draw the adjacent housings together, and, when rotated in the opposite direction, respective lock bars are released, each of said handles being provided with a permanently magnetized, semi-cylindrical guide band adapted to embrace the outer periphery of the joined housings, and the free ends of the guide bands of opposite handles being aligned for abutment when said handles are in locking position, whereby said handles are magnetically maintained in locking position.

References Cited by the Examiner

UNITED STATES PATENTS

| | | | |
|---|---|---|---|
| 317,030 | 5/1885 | Siddall | 285—311 |
| 1,248,558 | 12/1917 | Scribner | 285—99 |
| 2,473,909 | 6/1949 | Ruchti | 285—330 |
| 2,512,999 | 6/1950 | Bruning | 137—614.04 |

FOREIGN PATENTS 432,319  7/1926  Germany.

WILLIAM F. O'DEA, *Primary Examiner.*

HAROLD WEAKLEY, *Examiner.*